(12) United States Patent
Shakimov et al.

(10) Patent No.: US 10,587,479 B2
(45) Date of Patent: Mar. 10, 2020

(54) GUI FOR ANALYSIS OF LOGICAL NETWORK MODIFICATIONS

(71) Applicant: Nicira, Inc., Palo Alto, CA (US)

(72) Inventors: Amre Shakimov, San Jose, CA (US); Xuan Kelvin Zou, Seattle, WA (US); Pankaj Thakkar, Cupertino, CA (US); Igor Ganichev, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 300 days.

(21) Appl. No.: 15/477,110

(22) Filed: Apr. 2, 2017

(65) Prior Publication Data
US 2018/0287885 A1    Oct. 4, 2018

(51) Int. Cl.
*H04L 12/24*    (2006.01)
(52) U.S. Cl.
CPC .............. *H04L 41/22* (2013.01); *H04L 41/08* (2013.01); *H04L 41/0813* (2013.01); *H04L 41/0866* (2013.01); *H04L 41/0873* (2013.01); *H04L 41/12* (2013.01); *H04L 41/14* (2013.01)
(58) Field of Classification Search
CPC ..... H04L 41/08; H04L 41/22; H04L 41/0813; H04L 41/0866; H04L 41/0873
See application file for complete search history.

(56) References Cited

U.S. PATENT DOCUMENTS

| | | | |
|---|---|---|---|
| 6,118,760 A | 9/2000 | Zaumen et al. | |
| 6,792,423 B1 | 9/2004 | Jeffries et al. | |
| 6,834,139 B1 | 12/2004 | Prairie et al. | |
| 7,079,544 B2 | 7/2006 | Wakayama et al. | |
| 7,089,240 B2 | 8/2006 | Basso et al. | |
| 7,194,661 B1 | 3/2007 | Payson | |
| 7,349,382 B2 | 3/2008 | Marimuthu et al. | |
| 7,702,630 B2 | 4/2010 | Basso et al. | |

(Continued)

FOREIGN PATENT DOCUMENTS

| | | |
|---|---|---|
| WO | 2012093429 A1 | 7/2012 |
| WO | 2012126488 A1 | 9/2012 |
| WO | 2015006354 A1 | 1/2015 |

OTHER PUBLICATIONS

Berde, Pankaj, et al., "ONOS Open Network Operating System An Open-Source Distributed SDN OS," Dec. 19, 2013, 34 pages.

(Continued)

*Primary Examiner* — Lashonda T Jacobs
(74) *Attorney, Agent, or Firm* — Adeli LLP (57) ABSTRACT

Some embodiments provide a method for an integrated network management and modification analysis system. At the integrated system, the method receives a proposed modification to configuration data for a logical network stored by the integrated system as a set of rules. Without implementing the proposed modification, the method analyzes changes to the rules that would occur based on the proposed modification. The method provides a graphical user interface (GUI) that indicates logical network entities affected by the proposed modification. In response to a command to implement the proposed modification, the method generates an updated set of rules at the integrated system and stores the updated set of rules for distribution to managed forwarding elements that implement the logical network.

24 Claims, 6 Drawing Sheets

(56) References Cited

U.S. PATENT DOCUMENTS

| | | | |
|---|---|---|---|
| 7,827,591 B2* | 11/2010 | Sharma | G06F 16/258 726/2 |
| 8,693,344 B1 | 4/2014 | Adams et al. | |
| 8,750,164 B2 | 6/2014 | Casado et al. | |
| 8,942,085 B1 | 1/2015 | Pani et al. | |
| 8,964,569 B2 | 2/2015 | Jocha et al. | |
| 8,971,338 B2 | 3/2015 | Mishra et al. | |
| 9,042,234 B1 | 5/2015 | Liljenstolpe et al. | |
| 9,071,529 B2 | 6/2015 | Garg et al. | |
| 9,225,601 B2* | 12/2015 | Khurshid | H04L 41/0866 |
| 9,276,904 B2* | 3/2016 | Bansal | H04L 63/0263 |
| 9,667,653 B2* | 5/2017 | Barabash | H04L 63/20 |
| 9,674,087 B2 | 6/2017 | Jackson et al. | |
| 9,742,666 B2 | 8/2017 | Zhang et al. | |
| 9,755,963 B2 | 9/2017 | Zhang et al. | |
| 9,762,619 B1* | 9/2017 | Vaidya | G06F 9/455 |
| 10,044,676 B2 | 8/2018 | Padmanabhan et al. | |
| 2004/0037276 A1 | 2/2004 | Henderson et al. | |
| 2005/0053079 A1 | 3/2005 | Havala | |
| 2005/0135351 A1 | 6/2005 | Parmar et al. | |
| 2006/0029056 A1 | 2/2006 | Perera et al. | |
| 2006/0182037 A1 | 8/2006 | Chen et al. | |
| 2006/0206655 A1 | 9/2006 | Chappell et al. | |
| 2006/0230442 A1 | 10/2006 | Yang | |
| 2008/0148382 A1 | 6/2008 | Bartholomy et al. | |
| 2011/0137877 A1* | 6/2011 | Strassner | G06Q 10/00 707/694 |
| 2011/0320632 A1 | 12/2011 | Karino | |
| 2012/0155467 A1 | 6/2012 | Appenzeller | |
| 2012/0303835 A1 | 11/2012 | Kempf et al. | |
| 2013/0128746 A1 | 5/2013 | Yedavalli | |
| 2013/0163602 A1 | 6/2013 | Kang et al. | |
| 2013/0176850 A1 | 7/2013 | Mishra et al. | |
| 2013/0246655 A1 | 9/2013 | Itoh | |
| 2014/0133305 A1 | 5/2014 | Brolin et al. | |
| 2014/0146674 A1 | 5/2014 | Wang et al. | |
| 2014/0241356 A1 | 8/2014 | Zhang et al. | |
| 2014/0369209 A1* | 12/2014 | Khurshid | H04L 41/0866 370/250 |
| 2015/0009830 A1 | 1/2015 | Bisht et al. | |
| 2015/0016279 A1 | 1/2015 | Zhang et al. | |
| 2015/0016460 A1 | 1/2015 | Zhang et al. | |
| 2015/0043585 A1 | 2/2015 | Iihoshi et al. | |
| 2015/0117454 A1 | 4/2015 | Koponen et al. | |
| 2015/0222446 A1 | 8/2015 | Suresh et al. | |
| 2015/0237013 A1* | 8/2015 | Bansal | H04L 63/0263 726/13 |
| 2015/0358434 A1* | 12/2015 | Parthasarathy | H04L 69/22 370/392 |
| 2016/0057014 A1* | 2/2016 | Thakkar | G06F 9/45558 709/223 |
| 2016/0057052 A1* | 2/2016 | Zhang | H04L 45/28 709/239 |
| 2016/0112460 A1* | 4/2016 | Li | H04L 63/0236 726/1 |
| 2016/0173535 A1* | 6/2016 | Barabash | H04L 63/20 726/1 |
| 2016/0294772 A1* | 10/2016 | Padmanabhan | H04L 63/0263 |
| 2016/0323318 A1* | 11/2016 | Terrill | H04L 63/20 |
| 2017/0339188 A1* | 11/2017 | Jain | H04L 63/0428 |
| 2017/0346732 A1 | 11/2017 | Zhang et al. | |
| 2018/0063193 A1* | 3/2018 | Chandrashekhar | H04L 63/062 |
| 2018/0063195 A1* | 3/2018 | Nimmagadda | H04L 63/20 |
| 2018/0123880 A1* | 5/2018 | Wen | G06F 9/45558 |
| 2018/0227184 A1* | 8/2018 | Mentze | H04L 41/0816 |
| 2019/0036782 A1* | 1/2019 | Smith | H04L 41/0893 |

OTHER PUBLICATIONS

Gupta, Pankaj, et al., "Packet Classification on Multiple Fields," In Proc. of SIGCOMM, Month Unknown, 1991, 14 pages, Stanford, California, USA.

Krishnaswamy, Umesh, et al., "ONOS Open Network Operating System—An Experimental Open-Source Distributed SDN OS," Apr. 16, 2013, 24 pages.

Pfaff, Ben, et al., "OpenFlow Switch Specification," Sep. 6, 2012, 128 pages, The Open Networking Foundation.

Singh, Sumeet, et al., "Packet Classification Using Mutidimensional Cutting," SIGCOMM '03, Aug. 25-19, 2003, 12 pages, Karlsruhe, Germany.

Xie, Geoffrey G., et al., "On Static Reachability Analysis of IP Networks," Month Unknown, 2005, 14 pages.

* cited by examiner

GUI FOR ANALYSIS OF LOGICAL NETWORK MODIFICATIONS

BACKGROUND

Network management applications allow a user to configure and view information about logical networks in a datacenter (e.g., an enterprise datacenter, a multi-tenant datacenter, etc.). The applications allow users (e.g., network administrators) to modify their logical network(s) as well as to view information regarding the current network state (e.g., view information regarding the various applications, virtual machines, etc. deployed in the network). To modify the logical network, a user can add, delete, or modify firewall and/or forwarding rules. However, until the user makes these modifications, they are unable to determine the updated state, as this requires allowing the changes to propagate into the network.

BRIEF SUMMARY

Some embodiments provide an integrated network management and control system with a modification analysis tool that allows a user to input a possible modification to a logical network configuration managed by the system and, without actually implementing the modification, provide information to the user regarding the logical network entities that will be affected if the modification is made. In some embodiments, the integrated network management and control system uses headerspace analysis to determine changes to logical network entities and the functioning of the logical network that will occur if the proposed modification is implemented.

In some embodiments, the modification analysis is accessible as a GUI tool within a network management application that allows an administrator of a logical network to view and modify the logical network configuration by accessing the integrated network management and control system that stores the configuration and distributes the configuration data to managed forwarding elements that implement the logical network. For example, the administrator can add, remove, or modify logical forwarding elements (e.g., logical switches, logical routers), logical ports of these logical forwarding elements, etc. In addition, the administrator may add, remove, or modify distributed firewall rules in some embodiments.

Both the logical forwarding elements and the distributed firewall rules are implemented by managed forwarding elements in some embodiments. The managed forwarding elements operate as first-hop forwarding elements for data compute nodes (DCNs) such as virtual machines, containers, bare metal machines, etc. that logically connect to logical ports of the logical network (e.g., logical switch ports). In some embodiments, when one of the DCNs sends a packet, the first forwarding element to process the packet is a managed forwarding element that implements the logical network (e.g., a virtual switch or set of virtual switching/routing modules that operates on the same host machine as the DCN).

The integrated network management system, in some embodiments, receives a proposed modification (or set of modifications) through user input (e.g., through a GUI), and provides the proposed modification to the headerspace analysis function to simulate the implementation of the changes. The headerspace analysis, in some embodiments, identifies a set of logical network entities (e.g., DCNs, applications implemented by sets of DCNs, etc.) whose operations will be affected by the change, and returns this to the user as a GUI. The GUI of some embodiments provides interactive lists of these entities for the user to view.

In some embodiments, the headerspace analysis identifies all of the logical network configuration rules after the change and determines the entities affected by translating the network state into transfer functions. Specifically, some embodiments identify each managed forwarding element that implements the logical network, and determine the transfer function for each such managed forwarding element. The network transfer function of some embodiments is a composite of the transfer functions of all of the managed forwarding elements implementing the logical network. A transfer function for a particular managed forwarding element is a function that takes as input a packet header (either as a set of bits or a set of header field values) and an input port and specifies an output packet header and port. As a matter of simplicity, the packet headers may be expressed partly as wildcards when the output is independent of the value of certain bits or fields.

By modeling the entire network with the modified configuration rules applied, the headerspace analysis can perform various network checks. Some embodiments determine the changes between the previous (pre-modification) network state and the new (post-modification) network state (e.g., which rules have changed in which MFEs). In addition, the header space (e.g., an IP range) between any two points in the network can be computed by repeatedly applying the network transfer function to packet headers traversing multiple MFEs in the network. In various embodiments, the network transfer function may be used to perform reachability tests to determine whether packet headers sent from a first point in the network (e.g., a DCN) will reach a second point (e.g., another DCN, a logical router uplink that connects to an external network, etc.), determine whether loops are present, or identify other network issues. Some embodiments may also identify rules (e.g., security policies in the distributed firewall rules) that are not actually used (i.e., will not actually affect any possible packets), allowing the user to trim these rules from the configuration.

Some embodiments, rather than modeling each of the many MFEs, instead model the logical forwarding elements as transfer functions, and create a logical network transfer function. This logical network transfer function can then be used to perform the same checks as described above between any two logical network endpoints.

The headerspace analysis modules return the results of the various checks to the interface of the network management and control system with which the administrator interacts, the information is provided to the administrator in the GUI. In some embodiments, the GUI provides an indication as to one or more of (i) the rules added/removed/changed by the modification, (ii) the applications affected by the modification, (iii) the DCNs affected by the modification (a given application may be running on multiple DCN, and a given DCN may have multiple applications running), and (iv) network problems identified (e.g., unreachability issues, network loops, etc.).

In some embodiments, the integrated network management and control system manages numerous isolated logical networks (e.g., for different tenants) that are implemented in the same physical network (e.g., the same datacenter or datacenters). When different administrators access the network management system (e.g., via applications operating on different devices, that log in with different accounts), they only view the configuration information for their own logical networks. Thus, such embodiments may receive proposed modifications from one administrator for a first logical network and proposed modifications from a different administrator for a second logical network. The integrated network management system analyzes these modifications separately and provides separate GUIs to the different administrator applications.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide an integrated network management and control system with a modification analysis tool that allows a user to input a possible modification to a logical network configuration managed by the system and, without actually implementing the modification, provide information to the user regarding the logical network entities that will be affected if the modification is made. In some embodiments, the integrated network management and control system uses headerspace analysis to determine changes to logical network entities and the functioning of the logical network that will occur if the proposed modification is implemented.

In some embodiments, the modification analysis is accessible as a GUI tool within a network management application that allows an administrator of a logical network to view and modify the logical network configuration by accessing the integrated network management and control system that stores the configuration and distributes the configuration data to managed forwarding elements that implement the logical network. For example, the administrator can add, remove, or modify logical forwarding elements (e.g., logical switches, logical routers), logical ports of these logical forwarding elements, etc. In addition, the administrator may add, remove, or modify distributed firewall rules in some embodiments.

Figure 1:
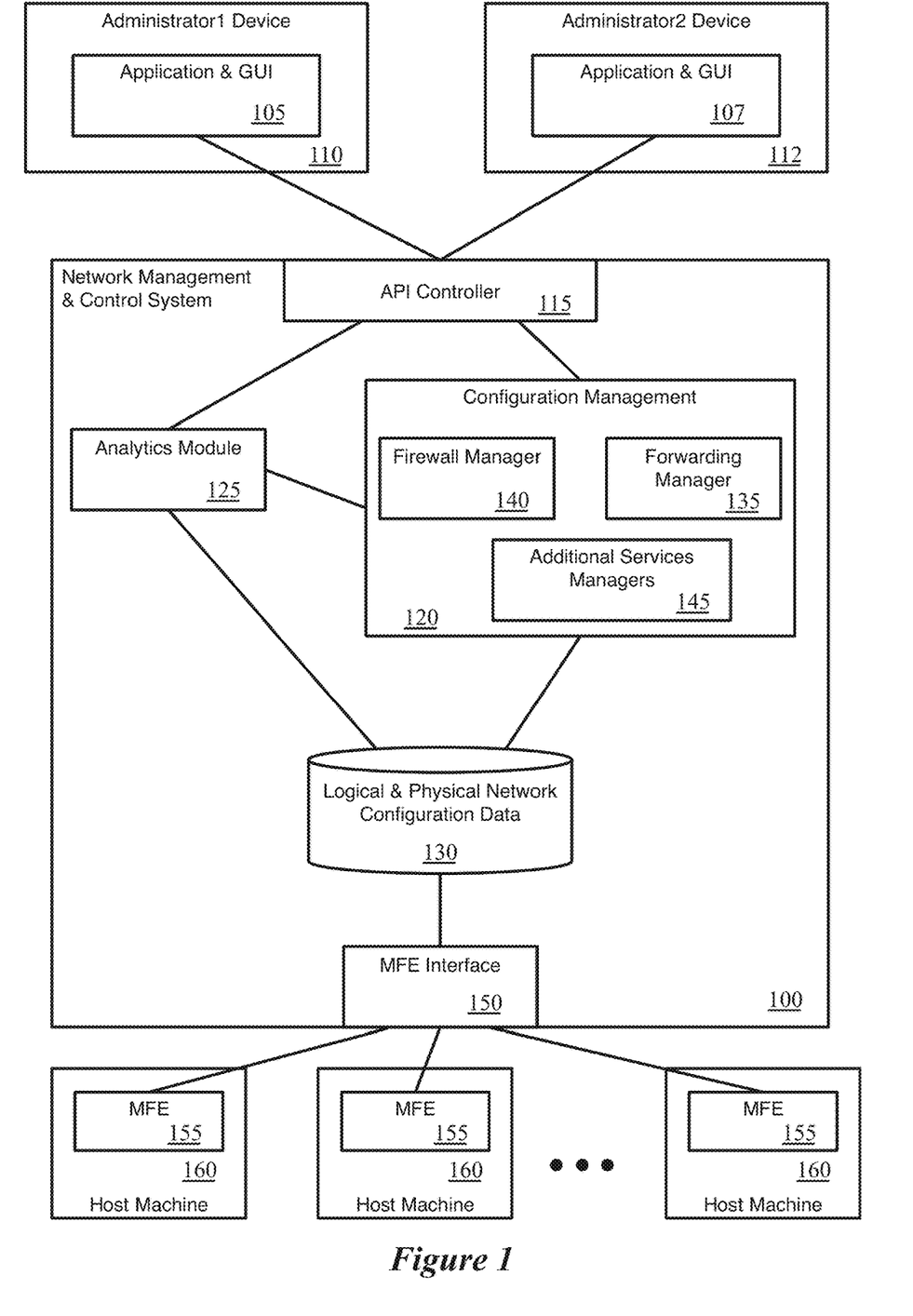
FIG. 1 conceptually illustrates the architecture of a management application that integrates with a network management and control system to provide analysis of proposed logical network configuration modifications within its GUI.

FIG. 1 conceptually illustrates the architecture of such an integrated network management and control system 100 that receives proposed logical network configuration modifications from network management applications and provides analysis of the proposed modifications to the management application GUI. In this example, devices 110 and 112 of two different administrators access the integrated network management and control system 100 (e.g., via two different user accounts).

The administrator devices 110 and 112 of some embodiments may be desktop or laptop computers, mobile phones, or other devices that an administrator uses to connect with the network management and control system 100. These devices 110 and 112 each run applications 105 and 107 that present a management application GUI to the administrator. An instance of the application 105 operating on the administrator machine 110 may be a separate management application that links with the network management and control system 100 in some embodiments. In other embodiments, the application 105 operating on the administrator machine 110 is a web browser or other generic application through which the administrator machine connects to the network management and control system 100 (e.g., as a thin client). The application 105 and its GUI sends commands to an API controller 115 of the network management and control system 100, and receives responses back (either in the form of a GUI description or as query response data that the application 105 converts into a GUI. The application 107 operating on the second administrator device 112 functions similarly as to the application 105, but accesses different logical network information by logging in with a different user account, in some embodiments. In discussion below, operations may be described in terms of the application 105 operating on the first device 110; it should be understood that the application 107 may provide similar requests and receive similar data, but for a different logical network or networks.

The network management and control system 100 of some embodiments, as shown, includes an API controller 115, a configuration manager 120, an analytics module 125, a logical and physical network configuration data storage 130, and a managed forwarding element (MFE) interface 150. While a single block is shown to represent the network management and control system 100, it should be understood that these functions may be spread among multiple different computing devices and/or separately functioning applications on a single computing device. For instance, in some embodiments the network management and control system 100 includes a centralized management plane and centralized control plane in addition to local controllers that operate on host machines (not shown) to directly control managed forwarding elements that implement the logical network. In addition, the various centralized aspects may be performed by one or more distributed clusters in some embodiments (e.g., a management cluster and a central controller cluster).

The API controller 115 is the interface through which the application 105 and its GUI/API (e.g., REST API) on the administrator device 110 communicates with the network management and control system 100. The application 105 sends various commands (e.g., proposed modifications for evaluation by the analytics module 125, actual modifications to the logical network configuration, etc.) to the network management and control system 100 via the API controller 115, which also returns the GUI information (e.g., either a GUI description or query response) to the application 105 through the API controller 115.

The configuration manager 120 is responsible for receiving configuration data (e.g., administrator input via the API controller 115) and generating the configuration rules in order for the logical network to be implemented. In some embodiments, the logical network configuration includes logical forwarding element configuration as well as distributed firewall configuration and other logical service configurations (e.g., DHCP configuration, distributed network encryption configuration, distributed load balancer configuration, etc.).

As shown in this figure, these configurations may be handled by separate modules. The forwarding manager 135 and firewall manager 140 are shown here specifically, as well as additional service managers 145 for other logical services. In some embodiments, the forwarding manager 135 handles the logical forwarding element configuration (e.g., for logical routers, logical switches, as well as their ports, policies, etc.), while the firewall manager 140 handles the addition, modification, and removal of distributed firewall rules, as well as the priority ordering of these rules. Similarly, other managers handle the rules for their respective configurations, such as distributed load balancing rules, distributed network encryption rules and key management (in some embodiments, the network management and control system 100 also includes a key manager for securely storing encryption keys and providing them to managed forwarding elements), etc. In addition, each of the forwarding manager 135, firewall manager 140, etc. may have multiple constituent modules for handling different functions.

The configuration rules for the various logical networks managed by the network management and control system 100 (e.g., generated by the configuration manager 120) are stored in the logical and physical network data storage 130 of some embodiments. The information stored in the data storage 130 includes the configuration of logical forwarding elements and their ports, distributed firewall rules, etc. In addition, the storage 130 stores information about the physical network implementation of these logical networks, including the host machines on which the various logical ports (i.e., logical network endpoints, such as VMs) are located. This information may be stored in a single central repository, replicated among multiple repositories in a cluster, and/or stored in a distributed manner in different embodiments.

In some embodiments, the logical forwarding elements, distributed firewall rules, and other aspects of the logical network (e.g., distributed load balancer rules, distributed network encryption, etc.) are implemented by managed forwarding elements (MFEs) 155. At least some of the MFEs 155 operate on host machines 160, and operate as first-hop forwarding elements for data compute nodes (DCNs) such as virtual machines, containers, etc. that logically connect to logical ports of the logical network (e.g., logical switch ports) and reside on the host machines 160. The MFEs that implement the logical network may also include gateways that implement centralized logical routing components in some embodiments. In some embodiments, when one of the DCNs sends a packet, the first forwarding element to process the packet is a MFE that implements the logical network (e.g., a virtual switch or set of virtual switching/routing modules that operates on the same host machine as the DCN).

The network management and control system 100 manages these MFEs in some embodiments by providing configuration data to the MFEs via the MFE interface 150. This MFE interface 150 is conceptual, as different embodiments may distribute this configuration data differently. In some embodiments, the network management and control system 100 includes a management plane that handles the translation of configuration input (as well as data received from the MFEs) into rules, and a central control plane that is responsible for distributing these rules to the appropriate host machines. In addition, local controllers that operate on the host machines translate the rules into the appropriate format for the MFE operating on the host machine (e.g., flow entries for flow-based MFEs).

The analytics module 125 performs analysis of proposed modifications (or of existing network state). The analytics module 125 receives a possible modification to a logical network configuration (including changes to distributed firewall rules) and, without necessarily implementing the modification, generates information to provide to the application 105 regarding logical network entities that will be affected if the modification is made. This module uses headerspace analysis to determine the changes to the logical network entities and to the functioning of the logical network that will occur if the proposed modification is implemented. The analytics module 125 also uses other techniques to perform analysis of proposed configuration modifications in some embodiments. For instance, changes to distributed network encryption rules may not be handled well by headerspace analysis, and thus the analytics module 125 uses other techniques to analyze these changes (e.g., to determine areas of exposure for packets that should be encrypted).

In some embodiments, the application 105 receives user input defining a proposed modification (or set of modifications) to the logical network managed by its administrator, and provides the proposed modification to the analytics module 125 of the network management and control system 100 (via the API controller 115), which simulates the implementation of the changes. The analytics module 125, in some embodiments, identifies a set of logical network entities (e.g., DCNs, applications implemented by sets of DCNs, etc.) whose operations will be affected by the change, and returns this to the application 105. The GUI of some embodiments then provides interactive lists of these entities for the user to view. Similarly, the application 107 might receive user input to propose a modification to the logical network managed by its administrator. The integrated network management and control system 100 would then perform similar analysis for this logical network and provide the information back to the application 107.

In some embodiments, the analytics module 125 identifies all of the logical network configuration rules after the change and determines the entities affected by translating the network state into transfer functions. Specifically, some embodiments identify each MFE that implements the logical network, and determine the transfer function for each such MFE. The network transfer function of some embodiments is a composite of the transfer functions of all of the managed forwarding elements implementing the logical network. A transfer function for a particular managed forwarding element is a function that takes as input a packet header (either as a set of bits or a set of header field values) and an input port and specifies an output packet header and port. As a matter of simplicity, the packet headers may be expressed partly as wildcards when the output is independent of the value of certain bits or fields.

By modeling the entire network with the modified configuration rules applied, the analytics module 125 can perform various network checks. Some embodiments determine the changes between the previous (pre-modification) network state and the new (post-modification) network state (e.g., which rules have changed in which MFEs). In addition, the header space (e.g., an IP range) between any two points in the network can be computed by repeatedly applying the network transfer function to packet headers traversing multiple MFEs in the network. In various embodiments, the network transfer function may be used to perform reachability tests to determine whether packet headers sent from a first point in the network (e.g., a DCN) will reach a second point (e.g., another DCN, a logical router uplink that connects to an external network, etc.), determine whether loops are present, or identify other network issues. Some embodiments may also identify rules (e.g., security policies in the distributed firewall rules) that are not actually used (i.e., will not actually affect any possible packets), allowing the user to trim these rules from the configuration.

In some embodiments, rather than modeling each of the many MFEs, the analytics module 125 instead models the logical forwarding elements as transfer functions, and create a logical network transfer function. This logical network transfer function can then be used to perform the same checks as described above between any two logical network endpoints.

It should be understood that, while logical routers and switches are described, and an IP range is mentioned above, the principles described herein do not apply only to common IP-based networks. For communication within datacenters, other network layer (and transport layer) protocols may be used (e.g., proprietary protocols). Both the creation of logical networks and the configuration rules for these logical networks, as well as the headerspace analysis described herein, can apply to both TCP/IP-based networks as well as other protocols that may be used instead.

The analytics module 125 returns the results of the various checks to the GUI, which provides the information to the administrator. In some embodiments, the GUI provides an indication as to one or more of (i) the rules added/removed/changed by the modification, (ii) the applications affected by the modification, (iii) the DCNs affected by the modification (a given application may be running on multiple DCN, and a given DCN may have multiple applications running), and (iv) network problems identified (e.g., unreachability issues, network loops, etc.).

Figure 2:
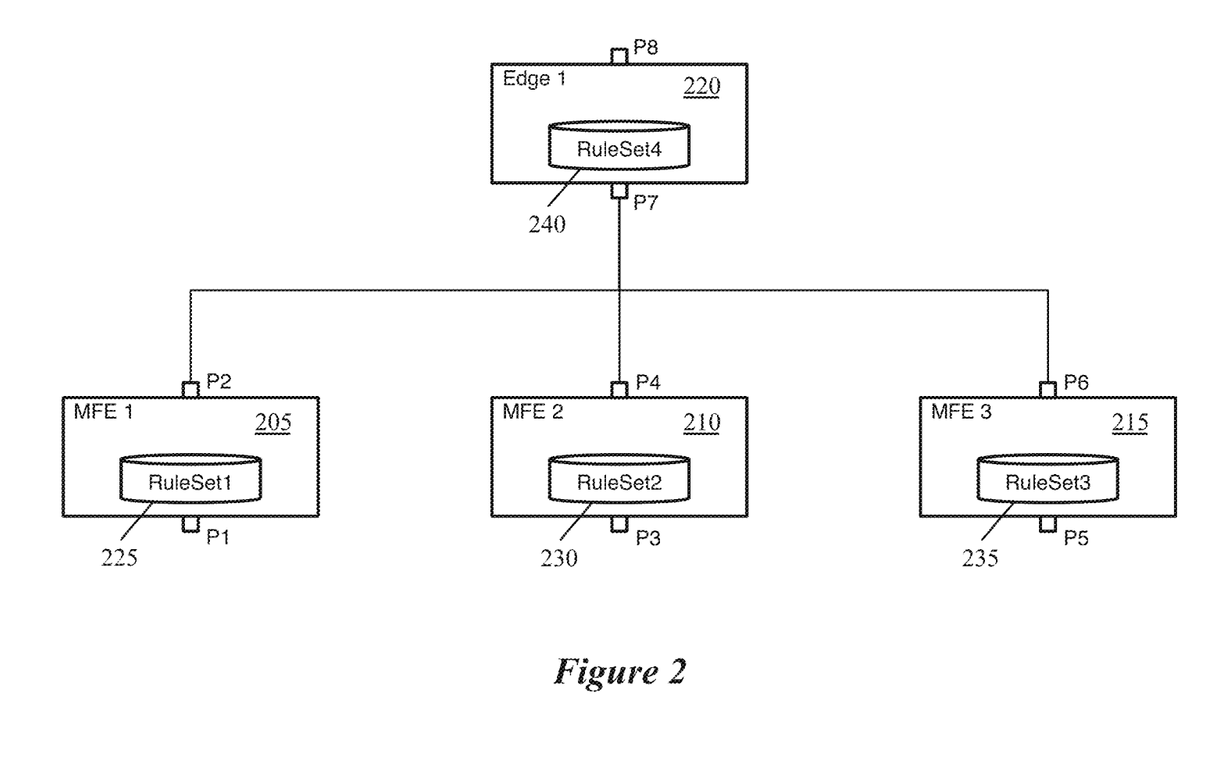
FIG. 2 conceptually illustrates a set of managed forwarding elements that implement a logical network.

As mentioned, some embodiments generate a network transfer function by generating transfer functions for each MFE implementing a logical network and composing these transfer functions. FIG. 2 conceptually illustrates a set of MFEs 205-220 that implement a logical network. In this case, only four MFEs (one of which is an edge gateway) implement the (very simplistic) logical network, though it should be understood that a typical logical network would be implemented by many more MFEs.

As shown, each of the MFEs 205-220 includes a set of rules 225-240 that defines how the MFE processes packets. The MFEs are configured to implement these rule sets 225-240 by the network management and control system of some embodiments. These sets of rules are intended to represent the rules relating to one particular logical network, although each MFE may actually implement multiple logical networks, with different sets of rules for each logical network.

In addition, two ports are shown for each MFE 205-220 (e.g., ports P1 and P2 for the first MFE 205). In this example, the ports P2, P4, P6, and P7 are tunnel endpoints that allow the MFEs to communicate with each other via a physical datacenter network. The ports P1, P3, and P5, on the other hand, are virtual network interface controllers that connect to data compute nodes of the logical network (e.g., virtual machines), which are not shown in the figure. The port P8 of the edge gateway 220 connects to external networks, and provides for communication between the logical network data compute nodes and the external networks. The transfer functions that are used to model a MFE are functions of both the header and the port.

Figure 3:
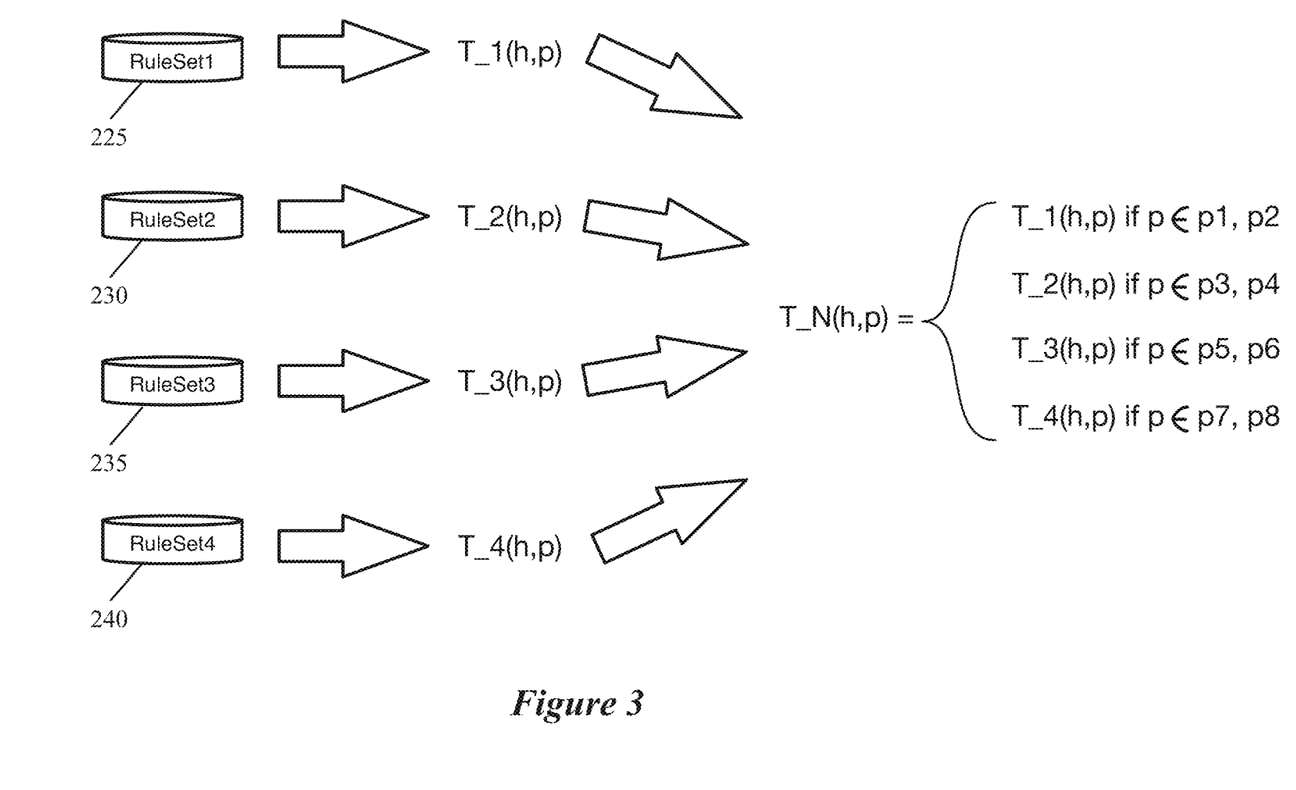
FIG. 3 conceptually illustrates the modeling of the set of MFEs into a network transfer function.

FIG. 3 conceptually illustrates the modeling of the set of MFEs 205-220 into a network transfer function. First, each MFE is modeled as its own individual transfer function based on the set of rules with which the MFE is configured. Thus, the first set of rules 225 is modeled as a first transfer function $T_1(h,p)$, the second set of rules 230 is modeled as a second transfer function $T_2(h,p)$, the third set of rules 235 is modeled as a third transfer function $T_3(h,p)$, and the fourth set of rules 240 is modeled as a fourth transfer function $T_4(h,p)$.

Each transfer function takes as its input a header (h) and an ingress port (p), and outputs a set of header/port pairs (this allows for multicasting, in which one input packet is output on multiple ports). That is, for a generic packet header input on a particular ingress port, the transfer function determines what the output header and egress port will be. Just as the network transfer function is built out of a set of individual MFE transfer functions, each MFE transfer function is built out of the set of rules that it implements. Each rule can be modified as a transfer function (typically involving many wildcard bits or fields, as the application of a particular is typically only be affected by a small number of fields of the overall packet header), and these transfer functions can be combined to identify the result for any packet header arriving at the MFE. For MFEs that operate in stages (e.g., a distributed firewall stage, a logical switching stage, a logical routing stage, etc.), these stages can be modeled as ordered transfer functions with connections between. That is, the logical switching stage can output a packet header (possibly modified) to a logical routing stage or a tunneling stage, in some embodiments. The MFE transfer functions do not generally need to be a mapping for every possible individual packet header, as many bits or fields can be wildcarded if they do not affect the processing of the packet by the MFE and are not modified by the MFE.

A conceptual packet, as represented by the HSA module of some embodiments, is an ordered set of bits (or header fields) at a particular port of an MFE. As the conceptual packet traverses the network, its port location and/or header bits are changed. For example, a MFE changes the port and possibly (often) the header bits, while a link between the MFEs (tunnels, typically) only change the port (and the outer headers, in some cases, if the HSA module keeps track of these outer headers). To represent the overall state of the network, as shown in FIG. 3, a network transfer function ($T_N$) is determined by the headerspace analysis module. As shown, this network transfer function $T_N$ is a combination of all of the individual MFE transfer functions for their respective input ports. That is, the network transfer function $T_N$ applies $T_1$ if the input port is p1 or p2, applies $T_2$ if the input port is p3 or p4, etc. As the functions of each MFE not only output a packet to one of their ports, but in fact on a link to a specific port of another MFE, the composition of multiple applications of the network transfer function can model the traverse of a packet through the network. Network transfer functions and other aspects of network modeling through headerspace analysis are discussed further in "Header Space Analysis: Static Checking for Networks", by P. Kazemian, et al., NSDI '12 Proceedings of the $9^{th}$ USENIX conference on Network Systems Design and Implementation, April 2012, which is incorporated herein by reference.

As noted above, by modeling the entire network with the modified configuration rules applied, the headerspace analysis can perform various network checks. Some embodiments determine the changes between the previous (pre-modification) network state and the new (post-modification) network state. For example, some embodiments identify how the transfer functions for each MFE have changed based on the new rules. As an example, adding a new DCN will create a new port on an MFE (and possibly add a new MFE, if the new DCN is added to a host machine that does not already host any DCNs for the logical network). Adding new firewall rules may affect all of the MFEs or only a subset of MFEs; in addition, the result may show that the new firewall rules do not actually affect the network transfer function because no packets could possibly ever match the new firewall rules (e.g., due to higher priority rules). In addition, the header space (e.g., an IP range) between any two points in the network can be computed by repeatedly applying the network transfer function to packet headers traversing multiple MFEs in the network.

In some embodiments, the network transfer function is used to perform reachability tests to determine whether packet headers sent from a first point in the network (e.g., a DCN) will reach a second point (e.g., another DCN, a logical router uplink that connects to an external network, etc.). Some embodiments perform this check for all pairs of logical network endpoints (e.g., in FIG. 2, for all twelve ordered pairs that can be made from the ports p1, p3, p5, and p8). Some embodiments start, for each source port, consider the space of all headers that can enter at that port (i.e., that can leave the DCN), then trace the resulting headerspace as this conceptual set of packets is passed through each MFE and link between the source and desired destination. If no header space remains at the destination, then the source cannot reach the destination. If header space remains, then the remaining header spaces (which may be distinct in the overall header space) are traced backwards (using inverse functions) to determine the headers that the source can send in order to reach the destination.

Some embodiments, alternatively or conjunctively, determine whether loops are present in the network. Loops occur when a packet returns to the port from which it was sent, and the headerspace analysis module of some embodiments determines the set of all packet headers that loop from each possible endpoint port. Some embodiments use a packet starting at a particular port with entirely wildcarded bits and track the packet until either it leaves the network (i.e., is sent out another endpoint port), it returns to the initial source port, or it returns to a different port more than once. The latter two cases are indicative of loops in some embodiments, and can be reported as such. The reachability and loop detection tests are discussed in more detail in "Header Space Analysis: Static Checking for Networks", by P. Kazemian, et al., which is incorporated by reference above.

In the above example, the headerspace analysis module models the MFEs in the network as transfer functions. In other embodiments, the headerspace analysis assumes that the MFEs themselves will correctly implement the logical network, and thus models the logical forwarding elements as transfer functions. In this case, similar analyses may be carried out using the logical network transfer function (i.e., reachability analysis, loop checking, determining network state differences, etc.).

Figure 4:
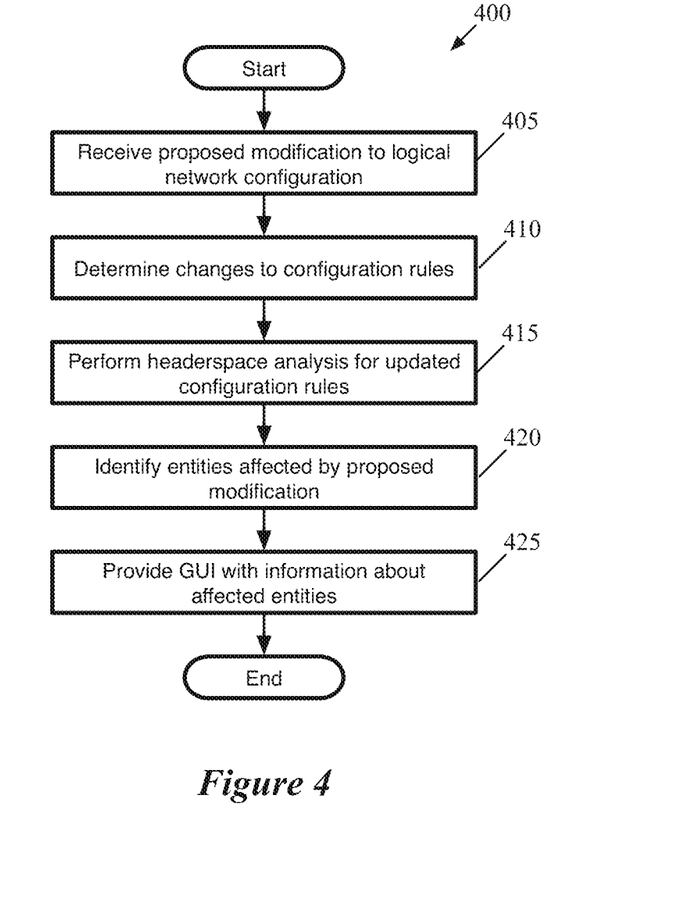
FIG. 4 conceptually illustrates a process 400 of some embodiments for using headerspace analysis to determine entities affected by a proposed modification to a logical network configuration.

FIG. 4 conceptually illustrates a process 400 of some embodiments for using headerspace analysis to determine entities affected by a proposed modification to a logical network configuration. The process 400 is performed, in some embodiments, by a network management and control system for managing the implementation of logical networks within a physical network (e.g., a datacenter or set of datacenters). In some embodiments, a network management application operates on a user device (e.g., an administrator computer) and provides the proposed modifications. In other embodiments, a generic application (e.g., a web browser) operates on the user device and allows the user to interact with network management and control system.

As shown, the process 400 receives (at 405) a proposed modification to a logical network configuration. In some embodiments, the network management and control system receives this proposed modification from an administrator of the logical network via a GUI command or REST API call. The GUI of some embodiments is designed such that the input of the proposed modification does not actually change the logical network configuration. That is, the network management and control system does not modify the configuration rules that are distributed to the MFEs that actually implement the logical network. Rather, the modification is received as a proposed modification to be analyzed by the headerspace analysis module.

The process 400 then determines (at 410) changes to the configuration rules that would occur based on the proposed modification. As mentioned, in some embodiments the process does not actually modify these configuration rules, but instead simulates which rules would be changed or deleted and the rules that would be added. These rules might be distributed firewall rules, in which case some embodiments simulate the new priority order of all of the distributed firewall rules. The proposed modification could also change the forwarding rules associated with one or more logical forwarding elements (e.g., due to the addition or removal of logical ports, the association of different addresses with logical ports, the addition or removal of logical forwarding elements, etc.).

Next, the process 400 performs (at 415) headerspace analysis for the updated configuration rules. As described above, this analysis involves generating a new network transfer function and performing a set of tests to determine issues that may arise as a result of the proposed modification. Some embodiments perform bidirectional reachability analysis for each pair of logical network endpoints (e.g., logical switch ports, logical router uplinks, etc.) to determine whether there are any endpoints that cannot successfully transmit packets to each other. In addition, some embodiments identify loops in the network, or identify other issues. Some embodiments also identify changes from the previous configuration to the proposed new configuration, such as the logical ports whose connectivity is different (e.g., as a result of new firewall rules). As noted above, in some embodiments, additional techniques may be used in addition to headerspace analysis (e.g., to analyze changes to distributed network encryption rules).

The process 400 also identifies (at 420) entities affected by the proposed modification. In some embodiments, these entities include the data compute nodes (e.g., VMs, containers, etc.) connected to logical ports of the network, that are actually operating in the physical network. For example, some embodiments identify pairs of DCNs that cannot communicate in at least one direction as entities affected. As applications operate on the DCNs, these applications are also identified in some embodiments. Furthermore, some embodiments identify any DCN the connectivity of which has changed in some regard. For instance, if a new firewall rule would affect some subset of packets sent by a particular DCN, some embodiments identify this DCN as affected, even if there is at least one class of packet that could reach any other logical port.

Finally, the process provides (at 425) a GUI with information about affected entities. In some embodiments, this information is provided via the API as a set of data structures, which the application operating on the administrator machine converts to a graphical visualization of the entities affected. In other embodiments (e.g., when the GUI is provided on a web browser), the actual graphical data is provided via the API.

Figure 5:
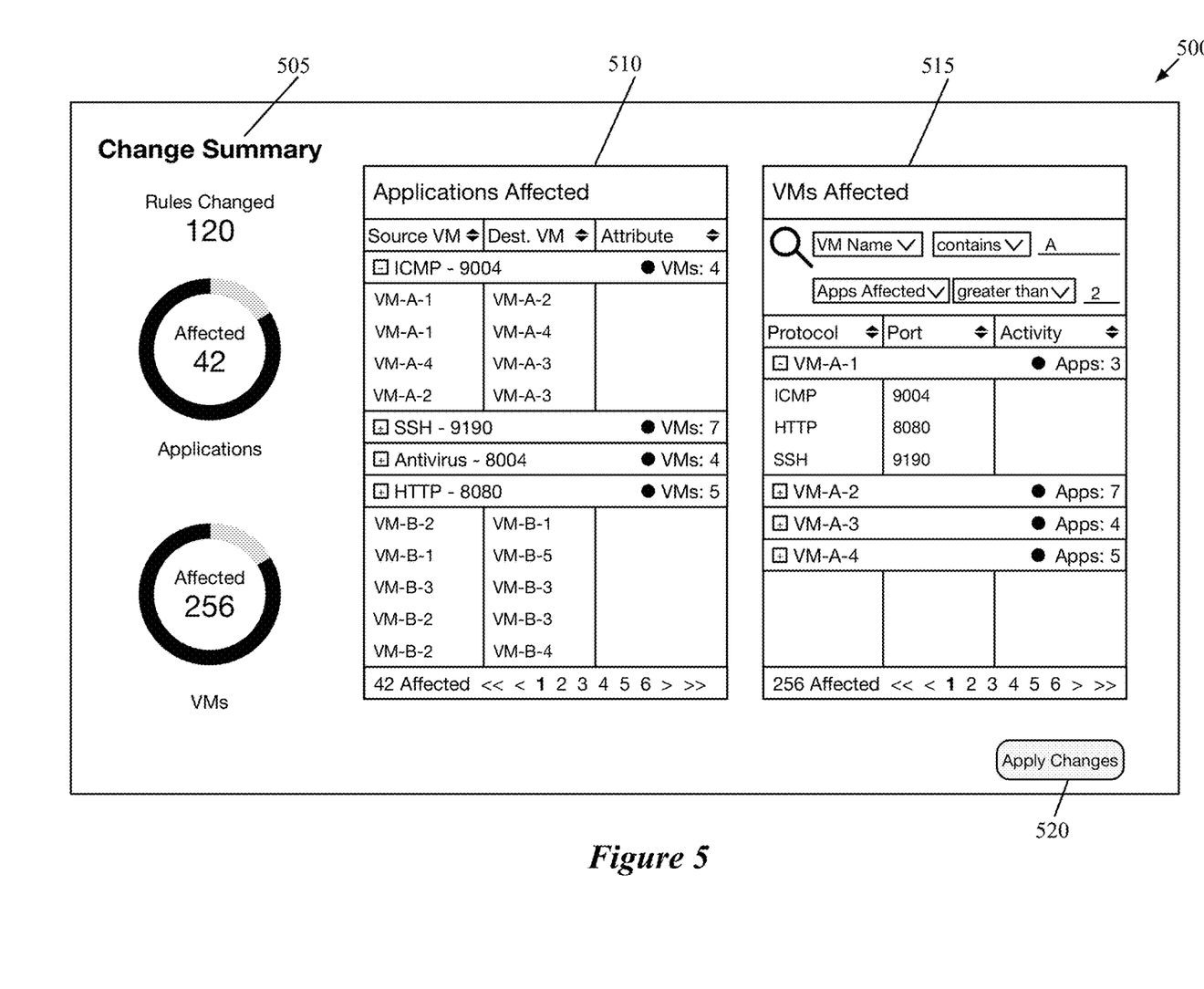
FIG. 5 illustrates an example of a GUI that displays the results of a proposed modification on various logical network entities.

FIG. 5 illustrates an example of such a GUI 500 that displays the results of a proposed modification on various logical network entities. In this example, the GUI 500 includes three sections: a summary 505 of the proposed modification and its effects, a first display area 510 indicating the applications affected by the proposed modification, and a second display area 515 indicating the VMs (or other types of DCNs, in other embodiments) affected by the proposed modification.

The summary 505 section of the GUI 500, in this example, simply summarizes the number of rules (e.g., firewall rules, logical forwarding rules, etc.) that are changed in the logical network configuration. These could be due to the addition or removal of logical forwarding elements or ports, the addition or removal of distributed firewall rules, modification of logical router policies, modification of firewall rules or logical ports, etc. In addition, the summary 505 indicates the number of applications that operate on the logical network DCNs that are affected (in this case 42) and the number of logical network VMs that are affected (in this case 256). Graphics 520 and 525 that display these numbers also indicate the approximate percentage of total applications and VMs that are affected in some embodiments, by the portion of the circle that is filled in. In both cases in the illustrated example, this percentage is approximately 80%.

The applications affected display area 510 of some embodiments illustrates information about the applications that are affected by the new network state. In this case, each application may operate on multiple DCNs, and send packets between various pairs of DCNs. Some embodiments, as shown in this example, display each application as an expandable row. Once a particular application is expanded, the display area 510 displays the pairs of VMs for which the application is affected. In this case, the first applications shown in the graph include ICMP, SSH, antivirus, and HTTP.

As shown, the display area has three columns: source VM, destination VM, and attribute. In some embodiments, the column headers are drop-down menus that allow the user to modify the information in each column (e.g., to switch the order of the source and destination VMs, to display different information in the columns, etc.). In addition, for each VM pair, some embodiments display an indicator that identifies whether communication is possible between the VMs (either in general, or for the application) based on the headerspace reachability analysis (e.g., a color indicator, with green indicating reachability and red indicating non-reachability).

Some embodiments also enable the user to select one of the pairs of DCNs in order to initiate a trace operation for application packets sent from the source to the destination. The trace operation indicates not just whether a packet is received at the endpoint, but all of the physical and logical processing performed along the way, allowing a user to identify why a packet is dropped. Some embodiments simulate this trace using the new, not-yet-implemented rules as part of the headerspace analysis.

The VMs affected display area 515 of some embodiments illustrates information about the VMs (or other DCNs) that are affected by the new network state. In this case, each VM may have multiple applications operating, and thus send packets for these various applications. Some embodiments, as shown in this example, display each VM as an expandable row. Once a particular VM is expanded, the display area 515 displays information for each of the applications operating on that VM. In this case, the first VM is expanded, and the display area 515 indicates that the three applications operating on this VM are ICMP, HTTP, and SSH.

As with the display area 510, the VMs affected display area 515 has three columns, which in some embodiments have drop-down menus that allow the user to modify the information shown for each VM when the VM is expanded. This example shows the columns as protocol, port in use for that protocol on the VM, and activity (e.g., the amount of VM activity for that protocol). In addition, for each application, some embodiments display an indicator that identifies whether that protocol is able to send and receive packets based on the headerspace reachability analysis (e.g., a red indicator if there is an issue with the application on the VM).

As shown, because the number of VMs affected may be very large (some logical networks may have hundreds or thousands of DCNs), some embodiments include a filter within the VMs affected display area 515. As shown, in this case, the user has filtered by VM names that contain "A" as well as the number of applications affected on the VM being greater than two. Other embodiments allow a user to filter by specific application names, ports used, etc.

The GUI 500 of some embodiments also includes a selectable item 520 for commanding the network management and control system to apply the proposed changes. As mentioned, in some embodiments the headerspace analysis and/or other assessments to proposed logical network configuration changes are performed by the same integrated network management and control system that also updates the configuration rules and distributes the updated configuration rules to managed forwarding elements that implement the logical networks. As such, some embodiments include the selectable item 520, which allows the user to command the system to implement the changes in the proposed modification.

It should be understood that the GUI 500 is only one possible GUI that different embodiments may display to indicate the changes that will occur as a result of a logical network configuration proposed by an administrator. For example, other possible GUIs might provide visualization of the rules being changed, provide a filter to show only pairs of DCNs that can no longer communicate, etc.

In addition, some embodiments allow the user to specify a set of assertions regarding the network. These assertions can include reachability constraints (e.g., that a first DCN can communicate with a second DCN, that a first DCN cannot communicate with a second DCN, etc.), that specific communication is always encrypted when outside of the source and destination hosts, etc. The GUI of some embodiments provides an interface for specifying and saving these assertions. When a modification is proposed, the back-end analysis (using headerspace analysis or other techniques) verifies whether these assertions are violated, and provides graphical feedback as well.

Figure 6:
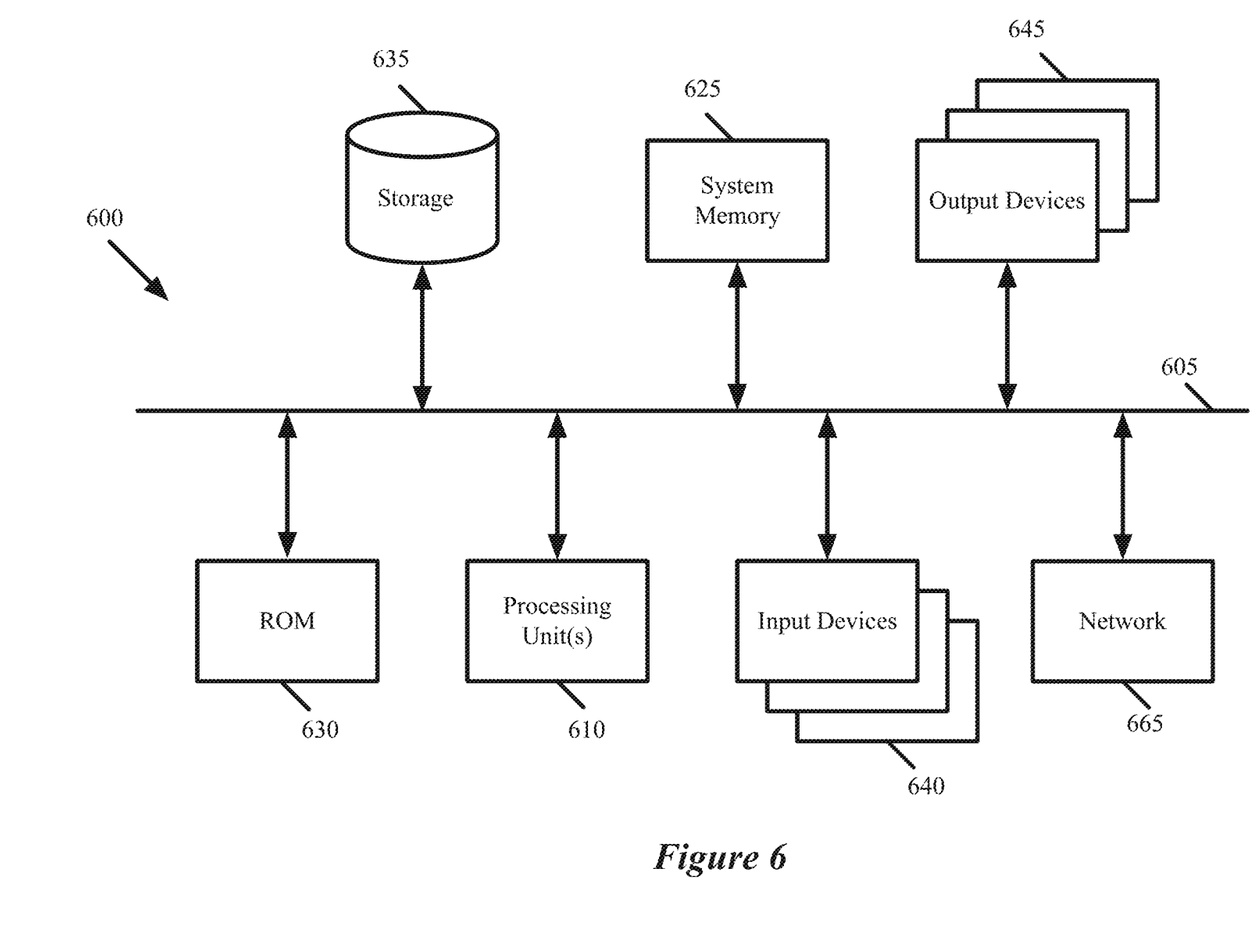
FIG. 6 conceptually illustrates an electronic system with which some embodiments of the invention are implemented.

FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
at an integrated network management and modification analysis system, receiving a proposed modification to configuration data for a logical network stored by the integrated network management and modification analysis system as a set of rules, wherein the logical network comprises a plurality of logical network entities;
without implementing the proposed modification, analyzing changes to the set of rules that would occur based on the proposed modification;
providing, for display, a graphical user interface (GUI) that (i) indicates how many rules in the set of rules would be affected by the proposed modification and (ii) identifies which logical network entities of the plurality of logical network entities would be affected by the proposed modification; and
in response to a command received through the GUI to implement the proposed modification, generating an updated set of rules at the integrated network management and modification analysis system and storing the updated set of rules for distribution to managed forwarding elements that implement the logical network.

2. The method of claim 1, wherein the set of rules comprises (i) forwarding rules and (ii) distributed firewall rules.

3. The method of claim 1, wherein the logical network configuration data defines a set of logical forwarding elements that logically connect a set of data compute nodes (DCNs), wherein the logical network entities comprise the set of DCNs.

4. The method of claim 3, wherein the set of DCNs operate on a set of physical host computers connected by a physical network, wherein at least a subset of the managed forwarding elements that implement the logical network operate on the physical host computers to implement the set of logical forwarding elements.

5. The method of claim 4, wherein the logical network configuration data further comprises a set of distributed firewall rules, wherein the managed forwarding elements further implement the distributed firewall rules.

6. The method of claim 3, wherein the logical network entities identified in the GUI as being affected by the proposed modification comprise (i) a set of applications and (ii) a subset of the set of DCNs, wherein each application operates on at least one DCN in the set of DCNs.

7. The method of claim 1, wherein when no command is received to implement the proposed modification, the updated set of rules is not stored by the integrated network management and modification analysis system for distribution to the managed forwarding elements.

8. The method of claim 1, wherein analyzing changes to the set of rules comprises:
identifying a new set of rules that would result from the proposed configuration data modification;
modeling a set of managed forwarding elements that implement the rules as a set of transfer functions based on the rules that each managed forwarding element implements; and
using the set of transfer functions to perform a set of checks to determine the logical network entities affected by the particular proposed modification.

9. The method of claim 8, wherein using the set of transfer functions comprises:
determining a network transfer function that models the set of managed forwarding elements collectively;
identifying sets of locations in the network between which data needs to be transmitted; and
using the network transfer function to perform the set of checks.

10. The method of claim 8, wherein the set of checks comprises at least one of (i) identifying reachability problems and (ii) identifying loops introduced into the network.

11. The method of claim 1, wherein the integrated network management and modification analysis system stores configuration data for a plurality of logical networks as a plurality of sets of rules, wherein the logical network is a first logical network that comprises a first plurality of logical network entities, the set of rules is a first set of rules, the GUI is a first GUI, and the proposed modification is a first proposed modification that is received from a first user account that owns the first logical network, the method further comprising:
receiving a second proposed modification, from a second user account that owns a second logical network, to configuration data for the second logical network stored by the integrated network management and modification analysis system as a second set of rules, wherein the second logical network comprises a second plurality of logical network entities;

without implementing the second proposed modification, analyzing changes to the second set of rules that would occur based on the second proposed modification; and providing, for display, a second GUI that (i) indicates how many rules in the second set of rules would be affected by the second proposed modification and (ii) identifies which logical network entities of the second plurality of logical network entities would be affected by the second proposed modification.

12. The method of claim 11 further comprising:

through the second GUI, receiving a command from the second user account to implement the second proposed modification; and generating an updated second set of rules at the integrated network management and modification analysis system and storing the updated second set of rules for distribution to managed forwarding elements that implement the second logical network.

13. The method of claim 12, wherein the managed forwarding elements that implement the first logical network and the managed forwarding elements that implement the second logical network have at least one managed forwarding element in common.

14. The method of claim 11, wherein the first user account and the second user account access the integrated network management and modification analysis system via different devices that send commands to a same interface.

15. The method of claim 1, wherein analyzing changes to the rules that would occur comprises identifying rules that do not affect processing of the managed forwarding elements implementing the logical network.

16. A non-transitory machine readable medium storing an integrated network management and modification analysis program for execution by at least one processing unit, the program comprising sets of instructions for:

receiving a proposed modification to configuration data for a logical network stored by the integrated network management and modification analysis program as a set of rules, wherein the logical network comprises a plurality of logical network entities;

without implementing the proposed modification, analyzing changes to the set of rules that would occur based on the proposed modification;

providing, for display, a graphical user interface (GUI) that (i) indicates how many rules in the set of rules would be affected by the proposed modification and (ii) identifies which logical network entities of the plurality of network entities would be affected by the proposed modification; and in response to a command received through the GUI to implement the proposed modification, generating an updated set of rules at the integrated network management and modification analysis program and storing the updated set of rules for distribution to managed forwarding elements that implement the logical network.

17. The non-transitory machine readable medium of claim 16, wherein:

the logical network configuration data defines a set of logical forwarding elements that logically connect a set of data compute nodes (DCNs);

the logical network entities comprise the set of DCNs;

the set of DCNs operate on a set of physical host computers connected by a physical network;

at least a subset of the managed forwarding elements that implement the logical network operate on the physical host computers to implement the set of logical forwarding elements.

18. The non-transitory machine readable medium of claim 16, wherein the logical network configuration data defines a set of logical forwarding elements that logically connect a set of data compute nodes (DCNs), wherein the logical network entities identified in the GUI as being affected by the proposed modification comprise (i) a set of applications and (ii) a subset of the set of DCNs, wherein each application operates on at least one DCN in the set of DCNs.

19. The non-transitory machine readable medium of claim 16, wherein when no command is received to implement the proposed modification, the updated set of rules is not stored by the integrated management and modification analysis program for distribution to the managed forwarding elements.

20. The non-transitory machine readable medium of claim 16, wherein the set of instructions for analyzing changes to the rules comprises sets of instructions for:

identifying a new set of rules that would result from the proposed configuration data modification;

modeling a set of managed forwarding elements that implement the rules as a set of transfer functions based on the rules that each managed forwarding element implements; and using the set of transfer functions to perform a set of checks to determine the logical network entities affected by the particular proposed modification.

21. The non-transitory machine readable medium of claim 20, wherein the set of instructions for using the set of transfer functions comprises sets of instructions for:

determining a network transfer function that models the set of managed forwarding elements collectively;

identifying sets of locations in the network between which data needs to be transmitted; and using the network transfer function to perform the set of checks.

22. The non-transitory machine readable medium of claim 21, wherein the sets of locations comprise pairs of DCNs that are required to transmit traffic to each other, wherein the set of checks comprises determining pairs of DCNs that are no longer reachable from each other.

23. The non-transitory machine readable medium of claim 16, wherein the integrated network management and modification analysis program stores configuration data for a plurality of logical network as a plurality of sets of rules, wherein the logical network is a first logical network that comprises a first plurality of logical network entities, the set of rules is a first set of rules, the GUI is a first GUI, and the proposed modification is a first proposed modification that is received from a first user account that owns the first logical network, the program further comprising sets of instructions for:

receiving a second proposed modification, from a second user account that owns a second logical network, to configuration data for the second logical network stored by the integrated network management and modification analysis program as a second set of rules, wherein the second logical network comprises a second plurality of logical network entities;

without implementing the second proposed modification, analyzing changes to the second set of rules that would occur based on the second proposed modification; and providing, for display, a second GUI that (i) indicates how many rules in the second set of rules would be affected by the second proposed modification and (ii) identifies which logical network entities of the second plurality of logical network entities would be affected by the second proposed modification.

24. The method of claim 6, wherein the GUI comprises (i) a summary of the proposed modification and its effects, (ii) a first display area identifying the set of applications affected by the proposed modification, and (iii) a second display area identifying the subset of the set of DCNs affected by the proposed modifications.

* * * * *